(12) United States Patent
Sandoz et al.

(10) Patent No.: US 9,375,800 B2
(45) Date of Patent: Jun. 28, 2016

(54) SEALED WELD ELEMENT FOR ATTACHMENT TO A VEHICLE COMPONENT AND METHOD

(75) Inventors: Edouard Stuart Sandoz, Powell, OH (US); Masahiro Ishikawa, Dublin, OH (US); Robert Zummallen, East Liberty, OH (US); Thomas H. Croyle, Milford Center, OH (US); James Paul Ryan, Powell, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 705 days.

(21) Appl. No.: 11/837,506

(22) Filed: Aug. 11, 2007

(65) Prior Publication Data

US 2009/0042049 A1    Feb. 12, 2009

(51) Int. Cl.
| | |
|---|---|
| *B23K 9/20* | (2006.01) |
| *B23K 35/02* | (2006.01) |
| *F16B 37/06* | (2006.01) |
| *F16B 37/14* | (2006.01) |

(52) U.S. Cl.
CPC .............. *B23K 9/20* (2013.01); *B23K 35/0288* (2013.01); *F16B 37/061* (2013.01); *F16B 37/14* (2013.01); *Y10T 428/8305* (2015.04)

(58) Field of Classification Search
CPC ...... B23K 35/0288; B23K 9/20; F16B 37/14; F16B 37/061; Y10T 428/8305
USPC ........... 428/36.9, 57; 403/194, 195, 201, 238, 403/242, 253, 270, 365, 366, 367, 368, 369, 403/370, 371; 411/171, 186, 930, 429, 435, 411/402
See application file for complete search history.

(56) References Cited

U.S. PATENT DOCUMENTS

| | | | | |
|---|---|---|---|---|
| 66,496 | A | * | 7/1867 | Ives ............................... 411/429 |
| 286,340 | A | * | 10/1883 | Spaulding ..................... 403/358 |
| 1,229,911 | A | * | 6/1917 | Dodds .......................... 411/186 |
| 1,941,175 | A | | 12/1933 | Johnson |
| 2,167,285 | A | * | 7/1939 | Smith ........................... 403/270 |
| 2,248,695 | A | * | 7/1941 | Bradshaw ..................... 411/410 |
| 2,268,520 | A | | 12/1941 | Wesley |
| 4,780,035 | A | | 10/1988 | Shibayama et al. |
| 4,873,763 | A | * | 10/1989 | Volonta et al. .................. 29/825 |

(Continued)

FOREIGN PATENT DOCUMENTS

| | | |
|---|---|---|
| EP | 1033502 | 9/2000 |
| JP | 2290922 | 11/1990 |
| JP | 2292511 | 12/1990 |

*Primary Examiner* — Nicholas Kokkinos
(74) *Attorney, Agent, or Firm* — Kenealy Vaidya LLP

(57) ABSTRACT

The projection weld element can include a barrel having a first axial end and a second axial end, a central axial bore being defined through the barrel from the first axial end towards the second axial end, and at least a portion of the central axial bore including an attachment structure, such as internal threads. A radial flange can extend from the second axial end of the barrel, with the flange including a distal axial face on a side of the flange facing away from the first axial end of the barrel and a proximal axial face on a side of the flange facing toward the first axial end of the barrel. The flange can include an annular projection weld ring formed along the proximal axial face of the flange on the same side of the flange as the barrel that extends from the flange. A method for joining a working piece with a weld element can include joining a working piece with the above-described weld element and heating the structures to effect a projection welding between the working piece and the weld element.

21 Claims, 2 Drawing Sheets

(56) References Cited

U.S. PATENT DOCUMENTS

| | | |
|---|---|---|
| 6,183,181 B1 * | 2/2001 | Leistner et al. ............... 411/177 |
| 6,347,901 B1 * | 2/2002 | Park et al. .................... 403/270 |
| 6,854,943 B2 | 2/2005 | Nagayama |
| 6,908,272 B2 * | 6/2005 | Nilsen et al. .................. 411/427 |
| 2003/0099524 A1 | 5/2003 | Chen |
| 2004/0081532 A1 | 4/2004 | Yu |
| 2004/0238510 A1 | 12/2004 | Mielke |

* cited by examiner

SEALED WELD ELEMENT FOR ATTACHMENT TO A VEHICLE COMPONENT AND METHOD

BACKGROUND

1. Field

The field of the presently disclosed subject matter is weld elements that are designed to facilitate the assembly of components of a vehicle when using welds, such as projection welds, to connect components of the vehicle. In particular, the disclosed subject matter is directed to a weld element that includes various sealing structure that prevents contaminants from passing through the weld element. The weld element can also include structures that allow venting of any outgassing that occurs during the welding procedures to ensure quality of the weld seal.

2. Brief Description of the Related Art

Weld nuts and bolts can be assembled to other metal parts such as body panels on a vehicle by projection welding. Projection welding allows for the production of a part with few heat surface marks on one side of the panel. One or more projections can be provided on the weld nut or bolt, and electrodes contoured to the finished part can be used in the welding process to achieve the desired results.

Flanged weld nuts that include integral washers have been used for assembling components such as vehicle components assembled to the body or frame of the vehicle. The flange of the flanged weld nut can bridge an oversized hole in a workpiece or body member to which another component is to be attached. Flanged weld nuts can be pre-attached to the workpiece or body member so that the body member can be bolted to something else. This method of attachment is useful in joining vehicle body parts and facilitates the assembly of the vehicle.

Projection welding is a common practice for joining a weld nut or other fastener to a metal sheet or other workpiece. Integral, discrete projections on a metal sheet contacting side of the weld nut provide fusible metal for the weld. Two counter-acting welding electrodes with flat contact surfaces hold the weld nut and workpiece together at a joining region with the projections on the weld nut pressing against the surface of the workpiece. A controlled electrical power source delivers a pulse of high amperage AC (or rectified AC) current through the facing electrodes, through the interposed weld nut, and the workpiece. Typically a 60 Hertz welding current is applied for several cycles of electrical current application (i.e., a fraction of a second). Although the entire nut and underlying workpiece area are heated, the higher density and momentary current flow through the projections tend to selectively melt the projections. When the current flow is stopped, the melt solidifies and the projections are fused to the workpiece.

Weld nut welding processes can use a copper welding electrode with a flat, full faced electrode tip to engage the top of the weld nut. The flat welding electrode tip is large enough to fit weld nuts of different sizes and is effective in applying clamping pressure on the flat surface of the top of the nut's barrel. A counteracting electrode can be provided to engage the opposite side of the workpiece.

SUMMARY

According to various aspects of the disclosed subject matter, a projection weld element can be provided with a barrel having a first axial end and a second axial end, a central axial bore being defined through the barrel from the first axial end to the second axial end, and at least a portion of the central axial bore including internal threads.

A radially extending flange can be provided at the second axial end of the barrel, with the flange including a distal axial face on a side of the flange facing away from the first axial end of the barrel and a proximal axial face on a side of the flange facing toward the first axial end of the barrel. The flange can also include an annular projection weld ring formed along the proximal axial face of the flange. The proximal axial face is defined herein as the face of the flange on the same side of the flange as the barrel extends from the flange. The distal axial face of the flange is on the opposite side of the flange from the proximal axial face, and forms an axial end surface of the projection weld element.

In accordance with other aspects of the disclosed subject matter, a method of joining an attachment means to a workpiece can include providing an attachment means in the form of a flanged weld element. The flanged weld element can include a barrel portion and an integral flange portion extending radially outward from a first axial end of the barrel portion. An annular projection weld ring can be provided on the flange portion protruding from a first axial face of the flange portion. Projection welding electrodes provided to weld the attachment means to the workpiece can include a projection welding electrode member for contacting the workpiece, and a projection welding electrode member for contacting the flanged weld element. The barrel portion of the flanged weld element can be inserted through a hole that penetrates the workpiece at a desired attachment location until the annular projection weld ring on the flange portion contacts a first surface of the workpiece in a circular region concentric to the hole through the workpiece. A contacting surface of the projection welding electrode member for contacting the workpiece can be pressed against a second surface of the workpiece opposite from the first surface. A contacting surface of the projection welding electrode member for contacting the flanged weld element can be pressed against a second axial face of the flange portion opposite from the first axial face. A suitable welding current can then be supplied to the projection welding electrode members and through the flange portion of the flanged weld element, through the annular projection weld ring, and through the abutting workpiece to provide a projection weld of the flanged weld element to the workpiece.

According to a further aspect of the disclosed subject matter, a projection welding assembly can include a workpiece and an internally threaded attachment means for establishing an anchor point on the workpiece. The internally threaded attachment means can include a boss means for defining internal threads and for establishing a spacer between the workpiece and a member to be attached to the workpiece. A projection weld ring support means can also be provided as an integral part of the internally threaded attachment means for positioning an annular projection weld ring substantially concentric to the boss means.

The projection welding assembly can be provided with the projection weld ring support means in the form of a radially extending flange conjoined with the boss means at one axial end of the boss means. The annular projection weld ring can be provided integral with the projection weld ring support means such that it protrudes from an axial surface of the projection weld ring support means in substantially the same direction as the boss means extends from the projection weld ring support means.

In accordance with another aspect of the disclosed subject matter a workpiece and a weld element can be provided. The weld element can be configured to establish an anchor point on the workpiece. The weld element can also include a barrel that includes a connective structure and also defines a spacer for spacing the workpiece from a member to be attached to the workpiece. Means for attaching the weld element to the workpiece in a contaminant-proof manner can be provided on the weld element and can include a projection weld ring that provides a barrier preventing the transmission of contaminants from a first side of the workpiece to a second side of the workpiece via the weld element.

In accordance with still another aspect of the disclosed subject matter, a method of joining a weld element to a vehicle body part in a sealed manner can include providing a vehicle body part including a hole therein and a weld element including a barrel portion and an integral flange portion extending radially outward from the barrel portion. The integral flange portion can include a first axial face that faces in an axial direction of the barrel portion and the barrel portion can include an axial bore therein that includes a connective structure. The axial bore can also include a structure configured to prevent at least one of material contaminants and gases from passing through the axial bore. The method can also include providing a projection weld ring on the flange portion, the weld ring protruding from the first axial face of the flange portion and extending in a continuous endless manner about the barrel portion, providing a projection welding device, inserting the barrel portion of the weld element through the hole defined in the vehicle body part until the projection weld ring on the flange portion continuously contacts a first surface of the vehicle body part in a region surrounding the hole through the workpiece. The method can also include forming a gas and vapor proof weld seal between the weld element and the vehicle body part about the barrel portion of the weld element by causing the weld ring to weld to the vehicle body part to form a continuous structure that surrounds the barrel portion and joins the vehicle body part and weld element in a continuous sealed manner.

In accordance with yet another aspect of the invention, a projection welding assembly for a vehicle can include a vehicle body part including a hole therein and a weld element configured to establish an anchor point at the hole in the vehicle body part while also preventing at least one of gases and material contaminants from passing through the body part, the weld element including. A barrel can be located in the hole in the vehicle body part, the barrel including a connective structure and defining a spacer that is configured to space the vehicle body part from a member to be attached to the vehicle body part. A flange portion can be located adjacent the barrel and include a proximal surface and a distal surface. A projection weld ring can be located on the proximal surface of the flange portion and extend continuously about 360 degrees around the barrel. The weld ring can be welded to the vehicle body part in a continuous manner about an entire periphery of the hole in the vehicle body part. The weld ring can also be configured to prevent transmission of at least one of gases and material contaminants from a first side of the vehicle body part to a second side of the vehicle body part.

Still other features and characteristics of the disclosed subject matter will become apparent to those skilled in the art from a reading of the following detailed description of exemplary embodiments constructed in accordance therewith, and taken in conjunction with the accompanying drawings.

BRIEF DESCRIPTION OF THE DRAWINGS

The disclosed subject matter can become more fully understood from the detailed description and the accompanying drawings, in which.

DETAILED DESCRIPTION OF EXEMPLARY EMBODIMENTS

Figure 1:
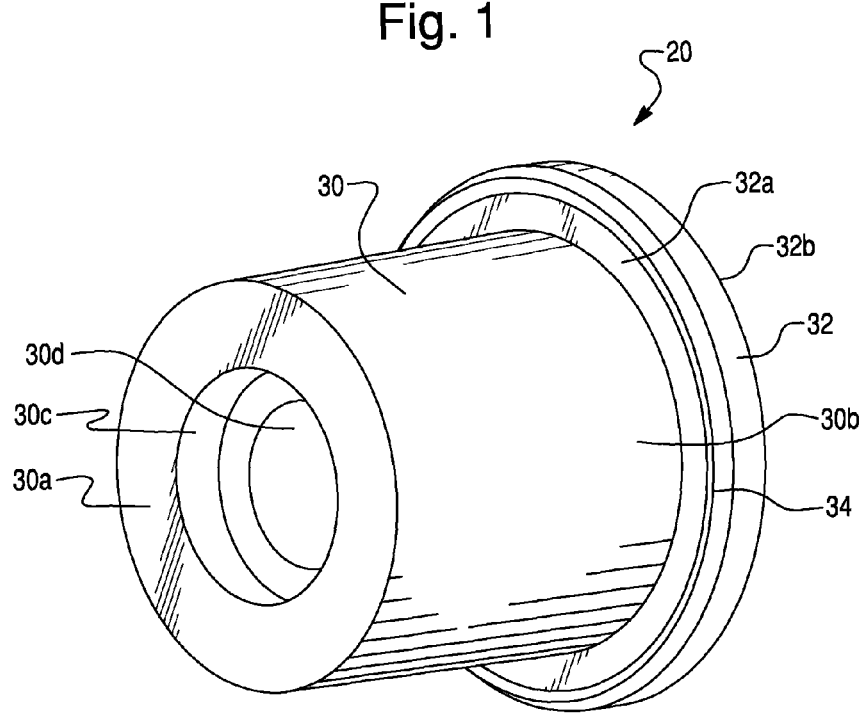
FIG. 1 is a perspective view of an embodiment of a flanged weld element made in accordance with principles of the disclosed subject matter.

An embodiment of a flanged weld element made in accordance with principles of the disclosed subject matter can include a barrel portion, the barrel portion including a central axial bore therethrough with an internal thread or other attachment structure formed along at least a portion of the bore. A radially extending flange can be located at one axial end of the barrel, the radially extending flange including a proximal surface contiguous with and facing the one axial end of the barrel and an opposite distal surface. A projection weld ring can be formed along the proximal surface of the flange and can extend 360 degrees about the flange at a radially outer circumference of the flange. The flange can be formed integral with the barrel by at least one of a machining, casting, forging, cold-working, stamping or pressing operation. Alternatively, the flange could be attached to the barrel using known methods of attachment including, but not limited to, welding, brazing, and soldering. The flanged weld element can be welded at a predetermined attachment location to a workpiece, e.g., to a vehicle body part that can include a vehicle frame part, a body panel, a firewall, skirting, a garnish, etc. The workpiece can be provided with a hole at the attachment location so that after attachment of the flanged weld element the workpiece can be bolted or otherwise attached to another object. The barrel portion of the flanged weld element can be passed through the hole in the workpiece until the projection weld ring contacts the workpiece. The weld ring can be an annular weld ring that is substantially concentric to the hole through the workpiece when being welded thereto, and can form a weld seal around the entire periphery of the hole in the workpiece.

The flange portion of the flanged weld element which has the pre-formed projection weld ring for welding formed along the proximal surface of the flange can be placed against the surface of the workpiece so that the weld ring projection lies against the workpiece and separates the flanged weld element from the workpiece by the height of the weld ring projection. Opposing electrodes can be brought into engagement with the flanged weld element on the opposite, distal surface of the flange from the weld ring projection, and the opposite side of the workpiece, pressing them together for effective welding force and current flow. Of course, other positional relationships for the electrodes can be used. In fact, the weld element or the workpiece can be used as an electrode, if desired. A suitable welding current can then be directed to the electrode(s) and through the flange portion of the element. The electrical current then travels through the weld ring projection from the flange, and through the abutting workpiece. The duration of current flow can be brief, possibly less than a second. The current density in the relatively small cross-sectional area weld ring projection can be sufficient to fuse the weld ring projection in a 360 degree sealing manner without fusing the entire flange that carries the weld ring projection. The molten metal from the melted weld ring projection can flow between the flange and workpiece surface, or can be expelled under the pressure of the electrodes. When current flow is stopped, the molten metal is cooled and solidified by heat flow to the cooler surrounding metal of the element, the workpiece, and/or other surrounding media.

The annular weld ring projection can be integral with the flange and formed of the same material. Alternatively, the weld ring projection can be separate from the flange, made from a different material, and/or separately adhered or attached to the flange. The weld ring should provide sufficient metal for the weld process. The continuous annular configuration of the weld ring can be configured to contact the workpiece in a continuous circular region around the hole through the workpiece, thereby providing a barrier against intrusion of gases, liquids, vapors or other contaminants through the hole in the workpiece. Moreover, the fact that the weld ring extends 360 degrees around the proximal surface of the flange allows it to form a substantially vapor proof and contaminant proof seal during and after the welding process. During the welding process, the weld ring can be pressed up against the workpiece to form a seal. Thus, vapor, solder, moisture, and other contaminants that may be present during the welding procedure can be prevented from transmission from one side of the workpiece to the other during welding. In addition, after the weld element is attached to the workpiece, the weld ring can be configured to form a seal that prevents transmission of the above-described contaminants as well as other contaminants that may be present during use of the vehicle. For example, the weld element can prevent the transmission of sulfur gases, carbon monoxide gases, water, vapor, other gases, etc., from transmitting through the vehicle body part, workpiece, etc. Transmission of the contaminants after the weld element is attached can be prevented because the final weld seal encircles the perimeter of the hole in the body part through which the weld element extends. Thus, the weld element can prevent various gases and contaminants from passing through a body part of a vehicle and into areas in which a vehicle occupant may notice or be affected by the gas or contaminant, or into areas in which the gas or contaminant may damage vehicle components.

It should be noted that the weld element can also include a sealing structure located in the axial bore of the barrel portion that is configured to prevent gases or other contaminants from passing through the weld element via the axial bore of the barrel portion. For example, if the weld element is cold rolled, a cap portion can be provided within the axial bore of the weld element to seal the weld element and prevent transmission of gases or other contaminants from one side of the vehicle body part to the opposite side of the vehicle body part. Alternatively, as explained in more detail below, a plug of material can be provided in the axial bore of the weld element to provide the sealing structure.

The configuration of the weld ring on the proximal portion of the flange in combination with the hole in the workpiece also allows for efficient outgassing during the welding process, which ensures a quality weld. More specifically, as described above, the weld ring can provide a barrier to solder, vapors, and other gases that are present during the welding process. By allowing sufficient space between the hole in the workpiece and the weld element, the gases that occur during the welding process can escape via the hole in the workpiece. Without such an escape route, the gases could be trapped within the weld ring and may push through the heated metal during the welding process to escape, which results in a poor weld and possibly a failed seal for the weld element.

A method of projection welding the flanged weld element to a workpiece according to an embodiment of the disclosed subject matter can utilize one or more welding electrodes. For example, an electrode member can be configured to engage the flanged weld element, and a separate electrode member can be configured to engage the workpiece on an opposite side from the annular weld ring projection on the flanged weld element. The electrode member for engaging the flanged weld element can include a recess formed in the face of the electrode tip such that only an outer circumferential rim portion of the electrode tip that substantially aligns with the annular weld ring projection will actually contact the flanged weld element on the distal face of the flange opposite from the annular weld ring projection. The electrode member for engaging the workpiece can similarly include a recess formed in the face of the electrode tip such that the electrode member can fit over the barrel portion of the flanged weld element that protrudes through a hole in the workpiece without touching the weld element. As a result, the electrode members can establish clamping pressure and electrical contact with only the flange portion of the flanged weld element in the area of the annular weld ring projection and the contacting area of the workpiece. The current then passes mainly through the flange and its underlying annular weld ring projection to the workpiece metal.

FIG. 1 shows a perspective view of a flanged weld element 20 according to one embodiment of the disclosed subject matter. The flanged weld element 20 can include a barrel 30 with a first axial end 30a and a second axial end 30b, and a radially extending flange 32 at the second axial end 30b of the barrel 30. The barrel 30 can include a central axial bore 30c extending through the barrel 30 from the first axial end 30a to the second axial end 30b. An internal attachment structure 30d, such as threads, rivet attachments, locking teeth, clamp(s), etc., can be provided in a portion of the central axial bore 30c.

Figure 2:
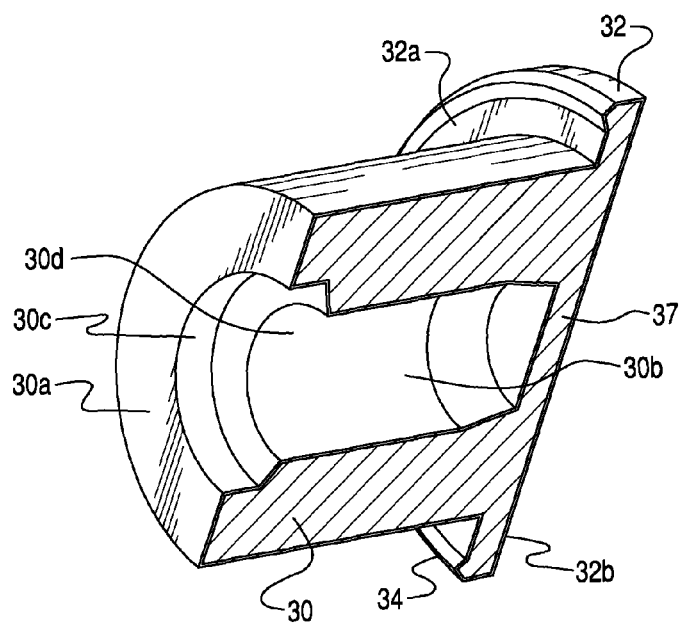
FIG. 2 is a partial cut-away perspective view of the flanged weld element as shown in FIG. 1.
Figure 3:
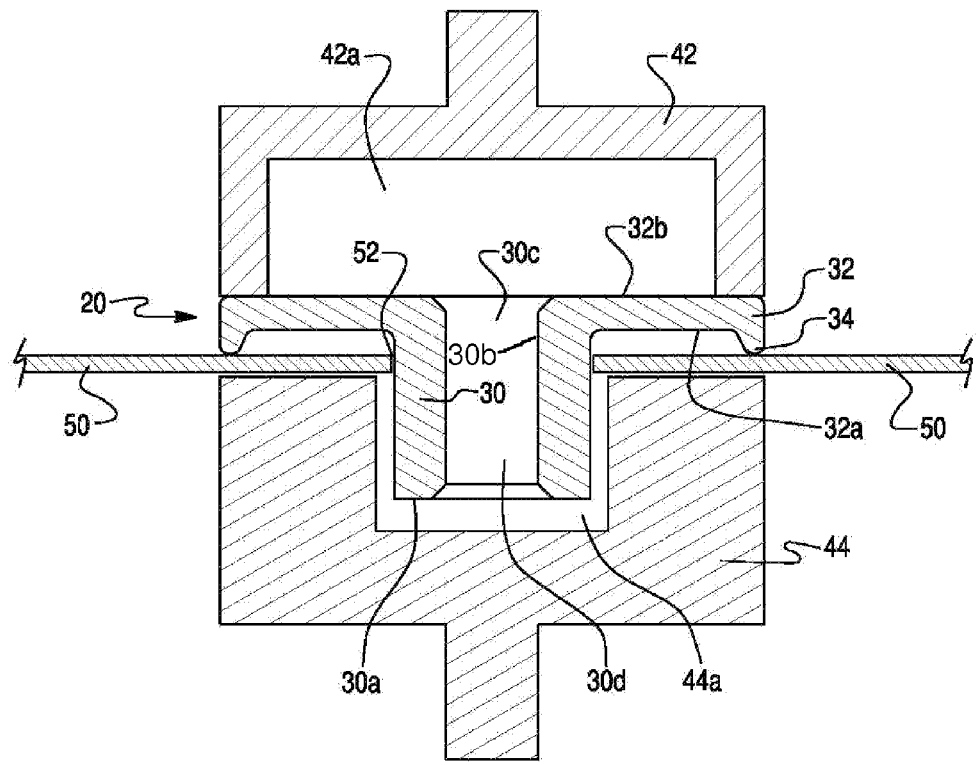
FIG. 3 is a cross-sectional view of another embodiment of a flanged weld element being welded to a workpiece in accordance with principles of the disclosed subject matter.

As shown in FIGS. 1 and 2, the radially extending flange 32 can include a first proximal face 32a contiguous with end 30b of barrel 30, and an opposite distal face 32b. An annular projection weld ring 34 can be formed along the proximal face 32a of the flange 32 at a radially outer circumference of the flange. The annular projection weld ring 34 can be provided with a substantially semi-circular cross-section, as shown in FIGS. 2 and 3, and can protrude from the proximal face 32a by an equal distance along its entire length in a continuous circle around the radially outer circumference of the flange. Alternative shapes for the annular projection weld ring 34 can include, but are not limited to, an elliptical cross-section, an oblong cross-section, a triangular cross-section, etc. The surface of the annular projection weld ring 34 that contacts a workpiece and that is eventually welded to the workpiece can lie in a single, continuous plane such that the annular projection weld ring 34 forms a continuous seal against the workpiece during the welding operation.

The weld ring 34 as shown in FIG. 2 extends in a in a 360 degree continuous manner about a perimeter of the flange 32. Thus, when the weld element 20 is connected to the workpiece, such as a vehicle body part, the weld ring 34 forms a sealed portion that prevents gas and other contaminants from transmitting through the weld element.

The annular projection weld ring 34 can be integral with the flange 32 and formed of the same material while also providing sufficient metal for the weld. As shown in FIGS. 1-3, the flanged weld element 20 can be projection welded to a workpiece 50, such as a body panel or a frame on a vehicle, by first assembling the flanged weld element 20 with its barrel 30 extending through a hole 52 in the workpiece 50. The annular projection weld ring 34 on the proximal face 32a of flange 32 can then be placed in contact with the workpiece 50.

The continuous annular configuration of the weld ring 34 contacts the workpiece in a continuous circle (or other continuous configuration) around the hole 52 through the workpiece 50, thereby providing a barrier against intrusion of liquids or vapors through the hole in the workpiece. The barrel 30 of the flanged weld element 20 can be dimensioned to extend through the hole 52 and protrude past the workpiece 50 by a predetermined distance such that the weld element can operate as a spacer between the workpiece 50 and another part to be attached to the workpiece using the flanged weld element 20 as an anchor point.

The weld element 20 in FIG. 2 is a cold rolled structure that includes a sealing structure formed as a cap portion 37 located across the barrel 30 of the weld element. The cap portion 37 prevents water, vapor, gas and other contaminants from being transmitted through the barrel 30 of the weld element 20. Thus, the weld element further insulates either side of the workpiece or vehicle body part, preventing gases and other contaminants from traveling through the different vehicle compartments.

As shown in FIG. 3, a method of projection welding the flanged weld element 20 to a workpiece 50 according to an embodiment of the disclosed subject matter can utilize one or more welding electrodes that include an electrode member 42 for engaging the flanged weld element 20 and an electrode member 44 for engaging the workpiece 50 on the opposite side of the workpiece from the annular weld ring projection 34 of the flanged weld element 20. The electrode member 42 for engaging the flanged weld element 20 can include a recess 42a formed in the face of the electrode tip such that only an outer circumferential rim portion of the electrode tip that substantially aligns with the annular weld ring projection 34 actually contacts the flanged weld element 20 on the distal face 32b of the flange 32 opposite from the annular weld ring projection 34.

The electrode member 44 for engaging the workpiece 50 can similarly include a recess 44a formed in the face of the electrode tip such that the electrode member can fit over the barrel portion 30 of the flanged weld element 20 that protrudes through the hole 52 in the workpiece 50 without touching the flanged weld element 20. As a result, the electrode members 42, 44 can establish clamping pressure and electrical contact with only the flange portion 32 of the flanged weld element 20 in the area of the annular weld ring projection 34 and the contacting area of the workpiece 50. The current then passes mainly through the flange 32 and its underlying annular weld ring projection 34 to the workpiece metal 50.

The first axial end 30a or second axial end 30b of the barrel 30 on flanged weld element 20 can also be provided with a sealing structure, such as a cap portion 37 or other plug means, to prevent liquids, vapors or other contaminants from entering the central axial bore 30c of the flanged weld element 20 and potentially causing defects in the attachment structure 30d, the interior space of the vehicle, or other undesirable results. The arrangement of the flanged weld element 20 with respect to the workpiece 50 during welding, and the provision of a cap or other seal across either or both of the first axial end 30a and the second axial end 30b can also prevent the intrusion of liquids, vapors or other contaminants through the opening 52 in the workpiece 50. The annular weld ring 34 can be configured to provide a continuous seal against the workpiece around the hole 52 through the workpiece. Furthermore, the provision of the annular weld ring 34 on the proximal face 32a of the flange 32 prevents any by-products of the welding operation or other contaminants from entering the central axial bore 30c.

Figure 4:
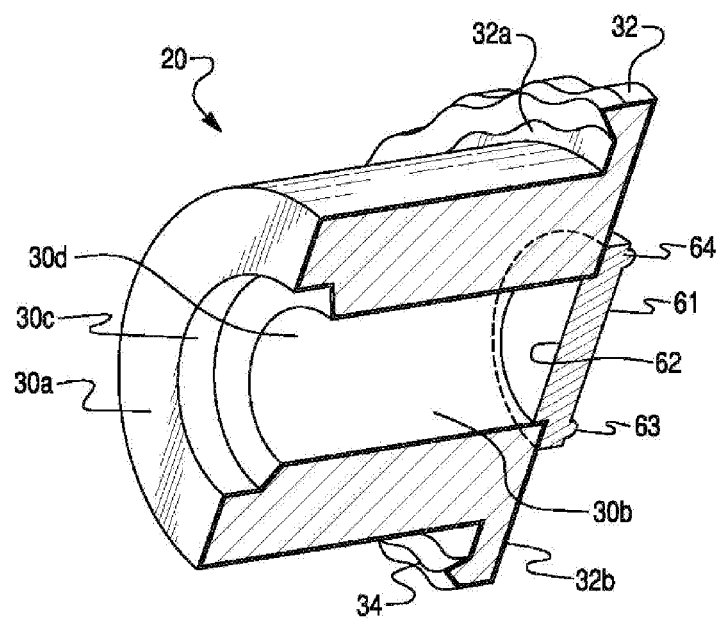
FIG. 4 is a partial cut-away perspective view of another embodiment of a flanged weld element.

FIG. 4 shows a partial cutaway perspective view of yet another exemplary embodiment of the disclosed subject matter. In this embodiment, the weld element 20 is formed with an axial bore 30c that extends entirely through the barrel 30. A sealing structure such as plug 61 can be provided for sealing the axial bore 30c of the weld element 20 after installation. The plug 61 can be provided with a central button portion 62 that is surrounded by a flange portion 64. The flanged portion 64 can be configured to mate with a distal bottom surface of the flanged weld element 20 such that fluid, liquid, and/or other contaminants can be prevented from transmission through the weld element 20. For example, the plug 61 can be attached to the weld element 20 via a connection structure 63 that is formed as a weld, an adhesive, a separate connector such as a screw, rivet, clamp, or bolt, or other known connection element.

The plug 61 can be made from the same material as the weld element 20, or can be a totally different material. For example, it is contemplated that the plug 61 be formed from a caulk type material and be attached to the axial bore 30c of the barrel 30 via the adhesive nature of the caulk. The caulk substance could be a metal cordierite type material that is sintered or otherwise attached to the weld element, or can be a typical polymer caulk substance. The plug 61 can also be configured to provide a vapor and/or liquid barrier while allowing air to be vented through the weld element 20, depending on the application of the weld element 20. A check valve could also be provided in the axial bore 30c of the weld element 20 to prevent liquid and/or other contaminants from transmitting through the weld element 20 in a first direction while allowing air and/or liquid to pass through the weld element 20 in a second direction opposite to the first direction.

The embodiment shown in FIG. 4 also depicts a weld ring 34 that has a non-circular shape. In this embodiment, the weld ring 34 is shown as a wavy member that projects from the outer perimeter of proximal face 32a of flange 32.

While certain embodiments of the invention are described above, it should be understood that the invention can be embodied and configured in many different ways without departing from the spirit and scope of the invention. For example, the annular projection weld ring 34 can be provided along a surface of the flange on the flanged weld element at various radial locations. In addition, the annular projection weld ring 34 can be configured in other shapes, such as oval, zig-zag, square, non-symmetrical, etc. about the flange 32. In addition, the weld ring 34 can be configured to mate with a surface of the vehicle body part to which it is being attached such that a good seal can be formed before, during and after the welding process. Thus, in many cases, the outer surface of the weld ring 34 in the axial direction will be planar to mate with a planar vehicle body part surface. However, if the vehicle body part has a stepped surface or other surface, the weld ring 34 can have an outer surface that exactly matches the mating surface on the vehicle body part.

The overall dimensions of the flanged weld element 20, including the barrel 30, the flange 32, and the annular projection weld ring 34 on the flange, can be varied and provided in different configurations to achieve the desired results. In addition, the weld element 20 can be formed as a weld nut, a weld bolt, weld stud, weld collar, or other known type of element for providing a connective structure within a vehicle.

The method for welding the weld element need not be accomplished in a consecutive order, and can be accomplished in different non-sequential orders without departing from the spirit of the disclosed subject matter. For example, the pressure that is applied to the workpiece 50 and weld element 20 can be applied before or after the current is applied to the electrode members 42, 44. In addition, the pressure can be applied by structures other than the electrode members 42, 44. For example, a clamping element could be provided for providing a pressure that is desired during the welding process. In addition, the electrodes 42, 44 need not conform to or only contact the flange portion 32 of the weld element 20. In fact, it is conceivable that one or more of the electrodes be a point electrode or other shaped electrode. Moreover, the electrodes used in the projection welding operation can be provided in different configurations to achieve the desired pressure points against the flanged weld element and the desired current flow for proper weld results. It should also be noted that it is possible that a relatively low amount of pressure can be applied during the weld process if, as described above, adequate venting of the gasses that occur during welding can be provided via spacing provided between the weld element and the hole in the vehicle body part. While resistance or spot welding is described above as a possible way to join the weld element to the vehicle body part, other forms of attachment are also contemplated, including laser welding, etc., and these other forms of attachment should be considered to fall within the scope of the disclosed subject matter.

While the invention has been described in detail with reference to exemplary embodiments thereof, it will be apparent to one skilled in the art that various changes can be made, and equivalents employed, without departing from the scope of the invention.

What is claimed is:

1. A projection weld element comprising:
   a barrel having a first axial end and a second axial end, and a bore extending entirely through the barrel from the first axial end to the second axial end, at least a portion of the bore including an attachment structure, the bore having a first opening adjacent the first axial end to receive a mating element that attaches to the barrel and a second opening adjacent the second axial end;
   a radially extending first flange adjacent the second axial end of the barrel, the first flange including a distal axial face on a side of the flange facing away from the first axial end of the barrel and a proximal axial face on a side of the first flange facing toward the first axial end of the barrel, the first flange including a projection weld ring located at the proximal axial face of the first flange, the weld ring extending in a continual endless fashion about the barrel; and
   a plug configured to extend into the second opening of the barrel and seal the second opening of the barrel;
   a second flange portion surrounding the plug portion and configured to mate with the second axial end of the barrel; and
   a connection structure configured to connect the plug to the second axial end of the barrel independently of the attachment structure.

2. The projection weld element of claim 1, wherein the projection weld ring is integral with the first flange and includes the same material as the first flange.

3. The projection weld element of claim 1, wherein the first flange is formed integrally with the barrel by at least one of a machining, casting, forging, cold-working, stamping or pressing manufacturing operation.

4. The projection weld element of claim 1, wherein the proximal axial face of the first flange is contiguous with the second axial end of the barrel.

5. The projection weld element of claim 1, wherein the projection weld ring is annular and is formed on the proximal axial face of the first flange along a radially outer circumference of the flange.

6. The projection weld element of claim 1, wherein the barrel includes a cylindrical member having a length and a diameter configured to fit through a hole in a workpiece member and also configured to extend beyond the workpiece member by a length sufficient to space the workpiece member from a component attached to the workpiece member using the projection weld element.

7. The projection weld element of claim 1, wherein the projection weld ring protrudes an equal distance from the proximal axial face of the first flange along the entire length of the projection weld ring in a continuous circle around a radially outer circumference of the first flange.

8. The projection weld element of claim 1, wherein the projection weld ring is configured in a non-circular fashion about the barrel.

9. The projection weld element of claim 1, wherein the attachment structure includes internal threads along at least a portion of the bore defined through the barrel.

10. A projection welding assembly for a vehicle, comprising:
    a vehicle body part including a hole therein; and
    a weld element configured to establish an anchor point at the hole in the vehicle body part while also preventing at least one of gases and material contaminants from passing through the body part, the weld element including,
       a barrel located in the hole in the vehicle body part, the barrel including a connective structure and a bore, the barrel defining a spacer that is configured to space the vehicle body part from a member to be attached to the vehicle body part, wherein the bore extends entirely through the barrel having first and second axial ends and having a first opening adjacent one end of the barrel at the first axial end to receive a mating element that attaches to the barrel, and a second opening adjacent the second axial end of the barrel; and
       a first flange located adjacent the second opening of the barrel and including a proximal surface and a distal surface,
       a projection weld ring located on the proximal surface of the first flange and extending continuously about 360 degrees around the barrel, and
    a plug configured to extend into the second opening of the barrel,
    a second flange portion surrounding the plug and configured to mate with the second axial end of the barrel, and
    a connection structure configured to connect the plug to the second axial end of the barrel independently of the connective structure in the barrel, wherein
       the weld ring is welded to the vehicle body part in a continuous manner about an entire periphery of the hole in the vehicle body part, the weld ring also being configured to prevent transmission of at least one of gases and material contaminants from a first side of the vehicle body part to a second side of the vehicle body part.

11. The projection welding assembly according to claim 10, wherein the weld ring is annular and forms a circle about the barrel of the weld element.

12. The projection welding assembly according to claim 10, wherein the weld ring forms a mating surface that is configured to continuously mate with and seal with a mating surface of the vehicle body part along the entire 360 degrees of the weld ring.

13. A method of joining a projection weld element to a vehicle body part in a sealed manner, the method comprising:
providing a vehicle body part including a hole therein;
providing the projection weld element according to claim 1;
providing a projection welding device;
inserting the barrel of the weld element through the hole defined in the vehicle body part until the projection weld ring on the first flange continuously contacts a first surface of the vehicle body part in a region surrounding the hole through the workpiece; and
forming a gas and vapor proof weld seal between the weld element and the vehicle body part about the barrel of the weld element by causing the weld ring to weld to the vehicle body part to form a continuous structure that surrounds the barrel and joins the vehicle body part and weld element in a continuous sealed manner.

14. The method of claim 13, wherein the projection weld ring is annular and integral with the first flange and includes the same material as the first flange.

15. The method of claim 13, wherein the first flange is formed integrally with the barrel by at least one of a machining, casting, forging, cold-working, stamping or pressing manufacturing operation.

16. The method of claim 13, wherein forming that gas and vapor proof weld seal is accomplished by one of laser welding and resistance welding.

17. The method of claim 13, wherein the projection weld ring is formed on the first axial face of the first flange along a radially outer circumference of the first flange.

18. The method of claim 13, further comprising:
allowing gases that are created during the forming of the weld seal to be exhausted from a space defined within the weld ring by providing a space between the barrel and the vehicle body part.

19. The method of claim 13, further comprising:
sealing the weld ring with the vehicle body part during the forming of the weld seal by contacting the weld ring in a continuous manner around an entire perimeter of the hole in the vehicle body part during the forming of the weld seal.

20. The method of claim 13, further comprising:
attaching the plug to the bore in the barrel of the weld element.

21. The method of claim 13, further comprising:
sealing the one of the first axial end and the second axial end of the barrel with the plug after forming a gas and vapor proof weld seal.

* * * * *